US007451308B2

(12) United States Patent
Karabulut

(10) Patent No.: US 7,451,308 B2
(45) Date of Patent: Nov. 11, 2008

(54) METHOD AND SYSTEM TO AUTOMATICALLY EVALUATE A PARTICIPANT IN A TRUST MANAGEMENT INFRASTRUCTURE

(75) Inventor: Yuecel Karabulut, Dortmund (DE)

(73) Assignee: SAP AG, Walldorf (DE)

( * ) Notice: Subject to any disclaimer, the term of this patent is extended or adjusted under 35 U.S.C. 154(b) by 813 days.

(21) Appl. No.: 10/964,492

(22) Filed: Oct. 12, 2004

(65) Prior Publication Data
US 2006/0080195 A1 Apr. 13, 2006

(51) Int. Cl.
*H04L 9/32* (2006.01)
(52) U.S. Cl. .............................. 713/156; 705/1; 705/64
(58) Field of Classification Search ................ 705/70
See application file for complete search history.

(56) References Cited

U.S. PATENT DOCUMENTS

| | | | | |
|---|---|---|---|---|
| 7,043,441 | B1 * | 5/2006 | Maher | 705/1 |
| 7,047,409 | B1 * | 5/2006 | Aull et al. | 713/173 |
| 7,100,049 | B2 * | 8/2006 | Gasparini et al. | 713/170 |
| 7,305,360 | B1 * | 12/2007 | Lamoureux et al. | 705/34 |
| 2002/0016777 | A1 * | 2/2002 | Seamons et al. | 705/76 |
| 2006/0174335 | A1 * | 8/2006 | Jorgenson | 726/10 |

OTHER PUBLICATIONS

Biskup et al., "A Hybrid PKI Model With An Application For Secure Mediation", Universitat Dormund, 2nd Annual PKI Research Workshop Pre-Proceedings, pp. 1-18, Jul. 31, 2002.

* cited by examiner

*Primary Examiner*—Matthew B. Smithers
(74) *Attorney, Agent, or Firm*—Blakely Sokoloff Taylor & Zafman LLP

(57) ABSTRACT

A system, to establish a trustworthy supplier in an online commerce environment, includes an aggregated service provider represents a buyer to source and evaluate a seller. The aggregated service provider collects the requirements from the buyer, whereby the requirements include product specification and qualifications of the seller. The aggregated service provider presents the requirements to a trusted service provider. At the same time, the aggregated service provider grants the trusted service provider a permit to issue bound property. A bound property is an award given to a seller in recognition for his qualifications. The trusted service provider first provides the seller with a Request For Invitation and requests the seller to submit a property certificate. The property certificate contains qualifications of the seller which are affirmed by a trusted agent. The trusted service provider evaluates the qualifications of the sellers based on the submitted property certificate and awards a bound property. In addition, the permit is forwarded to the seller. The seller then submits the bound property and the permit to the aggregated service provider. Therefore, the seller returns the permit to the aggregated service provider who is the original issuer of the permit. The aggregated service provider authenticates the seller based on the permit. The aggregated service provider translates the properties into access rights to certain transaction documents, such as Requests For Quotation (RFQ).

35 Claims, 7 Drawing Sheets

METHOD AND SYSTEM TO AUTOMATICALLY EVALUATE A PARTICIPANT IN A TRUST MANAGEMENT INFRASTRUCTURE

FIELD OF THE INVENTION

An embodiment relates generally to the field of online commerce. More particularly, an embodiment relates to a method and a system for establishing a trustworthy supplier in electronic environments, e.g., online trading environment, online shopping site, online auctioning site, online person-to-person trading site or other electronic environments where feedback of the participants are provided, including those within an Internet marketplace community.

BACKGROUND OF THE INVENTION

The Internet and the World Wide Web ("Web") have changed the landscape of information delivery and affected numerous aspects of life, including commerce. One benefit of this technological development is the ability to conduct business transactions globally via the Internet. As the volume of commerce conducted over the network continues to increase, collections of business units or organizations are working together to pool resources and expertise in order to achieve a common business objective. Organizations are sharing services and resources across enterprise boundaries in order to undertake collaborative projects that their participants could not undertake individually, or to offer composed services that could not be provided by individual organizations.

In this collaborative environment, a buyer often uses strategic sourcing process to find qualified sources to fulfill supply needs, negotiate agreements, manage contracts and evaluate seller qualifications. Often, the number of sellers available in the virtual world overwhelms the buyer, especially since the ability to verify and authenticate the identity and qualifications of the seller remains limited.

Moreover, security and trust, which form the core of any business transaction, are difficult to establish in the virtual world. Trust in a real world transaction is often provided through a physical meeting, reputation, recommendations or prior knowledge. In an electronic commerce environment, most business transactions occur between strangers that do not share a common security domain.

Some of the common online security issues include data eavesdropping, data tampering and entity repudiation. Often, credit card, social security and financial account numbers are stolen through data eavesdropping, whereby data remains intact but privacy is compromised. In a data-tampering event, the data is altered or replaced in a transaction. For example, someone can change the amount to be transferred to and from a bank account. In entity repudiation, the identity of the user is compromised. Often, data is passed to a person who poses as the intended recipient.

Many security and trust management technologies have been developed to meet the increasing demand for secure business transactions. One common security approach includes using the Public Key Infrastructure (PKI), which is the standard for public-key cryptographic security and is used to ensure the security of digital certificates. PKI infrastructure provides these security measures—user authentication, data integrity and confidentiality. With the PKI infrastructure, a pair of keys is used to provide strong authentication and encryption services. The key pair is associated with a user by the use of a certificate containing the user's public key and attributes associated with the user. Often, the certificate is digitally signed by a trusted third party, such as the Certification Authority (CA), and is valid only for a certain period of time. The public key associated with and certified by the certificate works with the corresponding private key possessed by the entity identified by the certificate. For example, to send data to an intended recipient, a sender first encrypts the data with the recipient's public key. Upon receiving the data, the recipient decrypts it with the corresponding private key. The PKI infrastructure is able to verify the identities of the participants through the certificate and maintain data integrity with the encryption technology.

SUMMARY OF THE INVENTION

In one embodiment, a method, for automatically evaluating a seller in a trust management infrastructure, includes issuing a permit and a bound property based on a property of a property certificate and returning the permit and the bound property in exchange for a right to access a protected item, wherein the property represents a qualifications of the seller and the bound property represents an award for the property.

According to another aspect of the present invention, a machine-readable medium is provided which comprises instructions, which when executed on a processor, caused the processor to perform the above mentioned method.

BRIEF DESCRIPTION OF THE DRAWINGS

An embodiment of the present invention is illustrated by way of example and not limitation in the figures of the accompanying drawings, in which like references indicate similar elements and in which.

DETAILED DESCRIPTION

A method and system to establish a trustworthy seller are described. In the following description, for purposes of explanation, numerous specific details are set forth in order to provide a thorough understanding of an embodiment of the present invention. It will be evident, however, to one skilled in the art that the present invention may be practiced without these specific details.

Strategic sourcing generally includes multiple acquisition platforms, such as auctions for buying or selling, private offers or public postings, basic requests for quotes and formal sealed requests for proposal. The aggregated service provider system and the trusted service provider system described herein provide a secure and systematic approach for strategic sourcing using various acquisition platforms.

Network Architecture

Figure 1:
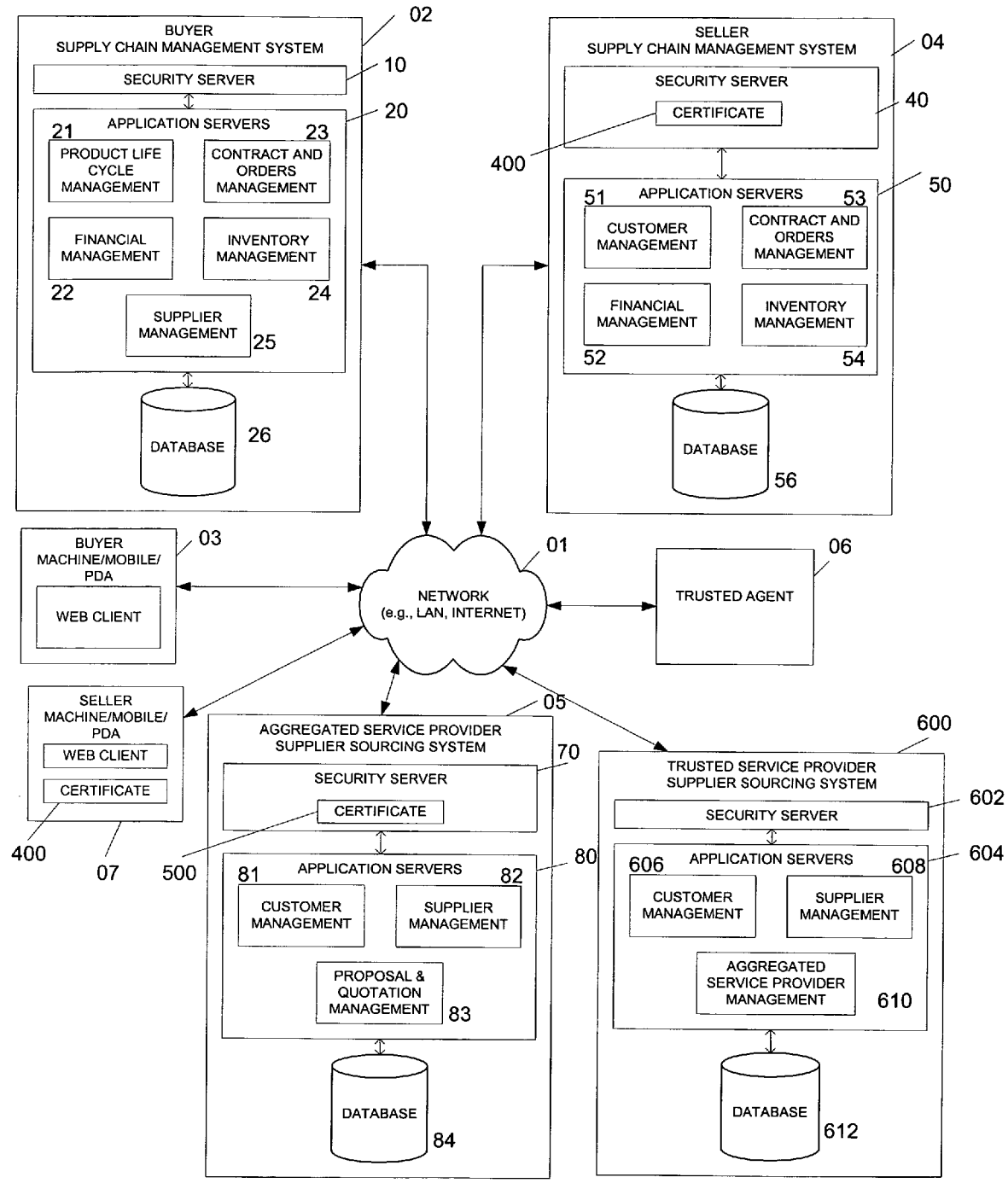
FIG. 1 is a network diagram depicting a system for establishing a trustworthy seller in accordance to one exemplary embodiment of the present invention.

FIG. 1 is a network diagram depicting a commerce network, according to one exemplary embodiment. The network is made up of an aggregated service provider system 05 connected to trusted service provider system 600, buyer system 02, 03, seller system 04, 07 and trusted agent 06, via a network 01 (e.g., the Internet). The aggregated service provider system 05 receives requirements from buyers 02, 03, these requirements including product configurations and qualifications of potential sellers. A seller system 04 with matching qualifications will then be selected to respond with a proposal.

The aggregated service provider system 05 evaluates the seller system 04 through the trusted service provider system 600. The aggregated service provider system 05 first provides the trusted service provider system 600 with a permit to issue a bound property to a seller system 04. The bound property is an award given to a seller system 04 with certain credentials. For example, the trusted service provider system 600 may issue an award to seller system 04 for on time delivery of services.

For a seller system 04 to participate in the process, the seller system 04 provides the trusted service provider system 600 with a property certificate 400 containing the qualifications or credentials. In one embodiment, the certificate 400 may be provided by an independent trusted agent system 06, which affirms the credentials and identity of the seller.

In response, the trusted service provider system 600 provides the seller system 04 with the permit and the bound property, which the seller system 04 submits to the aggregated service provider system 05. The permit that was originally issued by the aggregated service provider system 05 is therefore returned to the aggregated service provider system 05. Hence, through the permit, the aggregated service provider system 05 can verify that the seller system 04 is indeed selected by the trusted service provider system 600.

The aggregated service provider system 05 verifies the identity and credentials of the seller system 04. If the seller is qualified, the aggregated service provider system 05 provides the seller system 04 with a Request For Quotation (RFQ). The seller system 04 may then submit a quotation to the aggregated service provider system 05. The aggregated service provider system 05 compiles all the quotations from various qualified sellers and submits the quotation to the buyer system 02.

In one exemplary embodiment, the aggregated service provider system 05 contains an application server 80 that is coupled to a security server 70. The security server 70 provides security measures relating to user authentication, data integrity and data confidentiality. In one example, when a seller system 04 presents the permit and the bound property to the aggregated service provider system 05, the security server 70 verifies the identity of the seller and translates the bound property into access right to the relevant Request For Quotation (RFQ).

The aggregated service provider server 05 further contains application servers 80, which host one or more commerce applications, (e.g., applications for managing buyers and sellers relationship, analyzing the needs of buyers, evaluating and consolidating proposals from various sellers, etc.). In one embodiment, the application servers 80 provide the functions of customer management 81, supplier management 82, and proposal and quotation management 83. It will be appreciated that in alternative embodiments, the application servers 80 may include other applications, such as those hosted by the buyer system 02 or the seller system 04. For example, the aggregated service provider system 05 may contain the contract and orders management application 23 of the buyer system 02. The aggregated service provider system 05 therefore manages the contract and orders on behalf of the buyer.

The application servers 80 are in turn coupled to one or more databases 84 that store information of the buyers, sellers and business transactions. Though the security server 70, application servers 80 and databases 84 are presented within the same system 05, they are not restricted as such. For example, the database 84 may be remotely located from the aggregated service provider system 05.

In one embodiment, the trusted service provider system 600 includes a security server 602, application servers 604 and database 612. The security server 602 authenticates the certificate 400 of the seller system 04 to verify his identity. In addition, the security server 602 translates the properties encoded in the certificate 400 into bound property.

The application servers 604 of the trusted service provider system 600 include applications for managing customers 606, suppliers 608 and aggregated service provider 610. In another embodiment, the application servers 604 may include online commerce applications. The application servers 604 are connected to one or more database servers 612 that store information of the buyers, sellers, aggregated service provider and business transaction.

The supply chain management of the buyer system 02 provides product requirements and seller qualifications to the aggregated service provider system 05. The aggregated service provider system 05, on behalf of the buyer system 02, can then source and evaluate sellers based on the given information.

The buyer system 02 includes a security server 10 that protects business transactions conducted by the buyers with the external parties. The application servers 20 deliver the function of managing business transactions. In this exemplary embodiment, the applications servers 20 provide product life cycle management 21, financial management 22, contract and order management 23, inventory management 24 and supplier management 25. Other business applications may be hosted by the application servers 20.

In another setup, the buyer system 03, may be a simple machine, mobile device or PDA with a web client communicating with the other participants of the network 01.

The seller chain management o system 04 is similar to that of a buyer system 02. In this exemplary embodiment, the system 04 contains applications pertaining to supply management. These applications include customer management 51, financial management 52, contract and orders management 53 and inventory management 54.

The security server 40 of the system 04 presents the trusted service provider system 600 with the digital certificate of the sellers. The digital property certificate contains qualifications and credential information of the sellers. The trusted service provider system 600 uses the digital property certificate to evaluate the qualifications of the sellers and award the necessary bound property.

The seller system 07 is another embodiment of a seller, which includes a simple machine, mobile device or a PDA with a web client connected to the network 01. The system 07 further contains a digital certificate encoding the qualifications and credential information of the seller.

The trusted agent 06 acts as a trusted third party to ensure that participants who engage in online commerce can trust each other. The trusted agent 06 affirms that a participant, such as a seller, has a certain property and assigns the property as a digital certificate to the participant. A trusted agent 06 may be a certification authority (CA), a financial institute, a government board, a public reviewing community or a private reviewing community. The trustworthiness of the participants depends on the trust that is accorded on the trusted agent 06 who issued the certificates, as the trusted agent 06 has to accurately assess and verify the identity and properties of the participants.

In this exemplary embodiment, the system 05 shown in FIG. 1 employs a client-server architecture. The present invention is not limited to such architecture and could equally well find application in a distributed architecture system (e.g., a peer-to-peer).

In addition, while FIG. 1 shows that the aggregated service provider system 05 is hosted in a different network domain from the buyer system 02, the aggregated service provider system 05 may be integrated as part of the buyer system 02. This presents a case whereby the buyer owns the function of an aggregated service provider. Therefore, the aggregated service provider system 05 may be an independent organization or agency that manages sellers and buyers, or alternatively, the aggregated service provider system 05 may be an internal unit of a buyer system 02.

Security Architecture—Property Certificate

The security architecture of the exemplary embodiment uses property certificate for the purpose of assessing credibility and trustworthiness of the various participants. A trusted and licensed authority, such as a certification authority, may issue the certificate. The trusted authority affirms that a participant has a certain property by assigning the properties of the participant to the participant's certificate. This leverages the basic Public Key Infrastructure (PKI) functionalities required for the design of secure protocols for interaction between participants.

Figure 2:
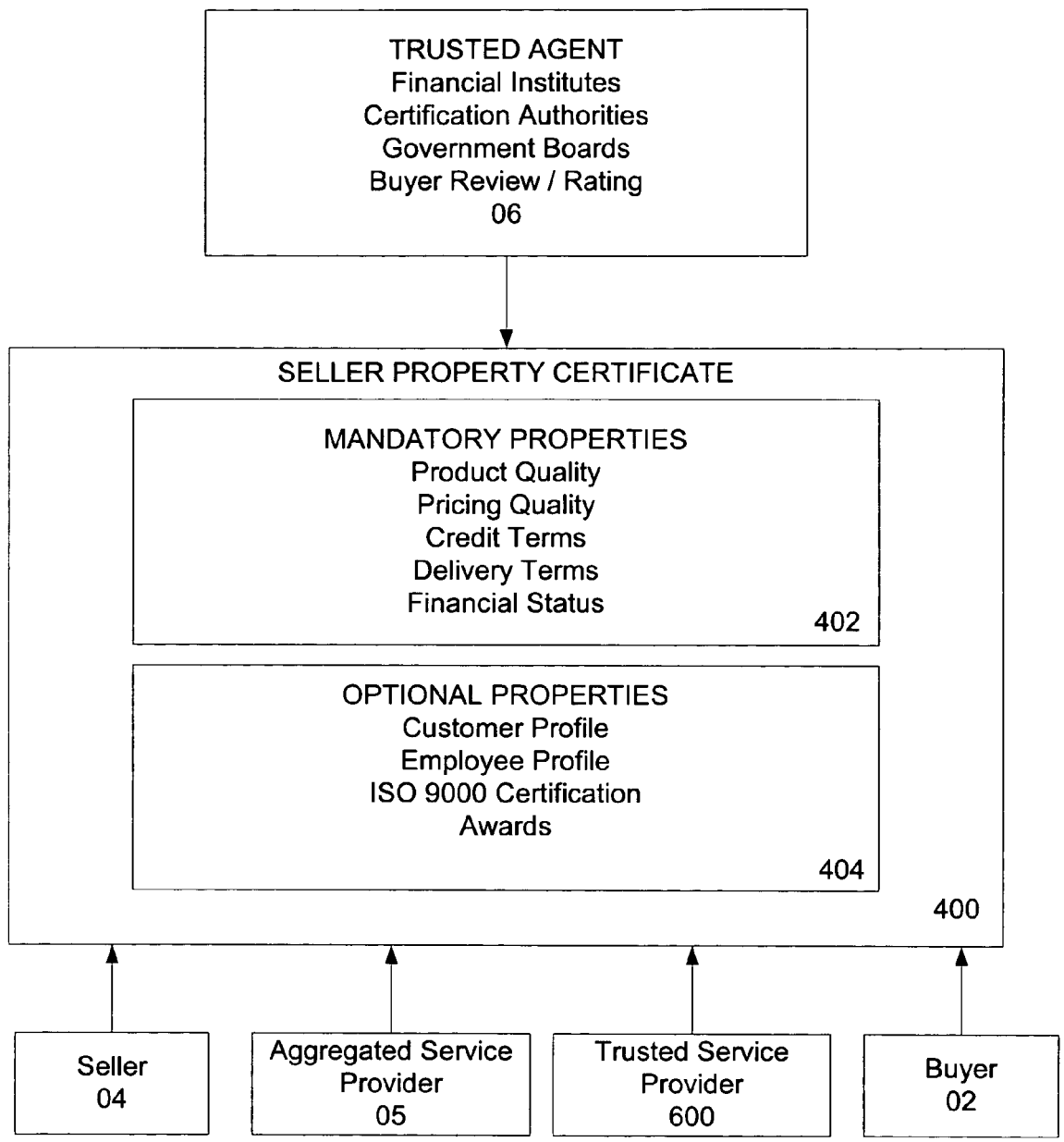
FIG. 2 is a block diagram of an exemplary embodiment of a property certificate of a seller.

Referring to FIG. 2, a property certificate 400 of a seller system 04 may include mandatory properties 402 and optional properties 404. Mandatory properties 402 are properties that the seller is required to present in order for the buyer to consider engaging the seller in a business transaction. Some examples of mandatory properties 402 include but are not limited to, product quality, pricing quality, credit terms, delivery terms and financial status of the seller. Optional properties 404 are properties that provide additional credentials of a seller. The properties may be weighted so that the buyer or the trusted service provider can quantify the qualification of the seller. In one example, the system of the trusted service provider may be configured to read the weighted properties and automatically rank the potential sellers.

Seller, aggregated service provider, trusted service provider, buyer, trusted agent or a combination of these, may define the types of mandatory properties 402 and optional properties 404. The trusted agent verifies the validity of these properties as submitted by the seller. Once the trusted agent has verified that a seller has a certain property, it assigns the property to the seller's certificate.

It will be noted that the properties listed in the property certificates 400 may be modified to cater to the requirements of different transactions. For example, the mandatory properties and optional properties classification may not be necessary in some situations. They may all be combined as a list of properties. In addition, a plurality of sellers may share a single certificate and therefore, the certificate reflects combined qualities of the sellers. In this example, the plurality of sellers may be sellers that have already established partnership or relationship to work together, and may therefore, be represented by a single virtual entity.

Security Architecture—Security Server

Figure 3:
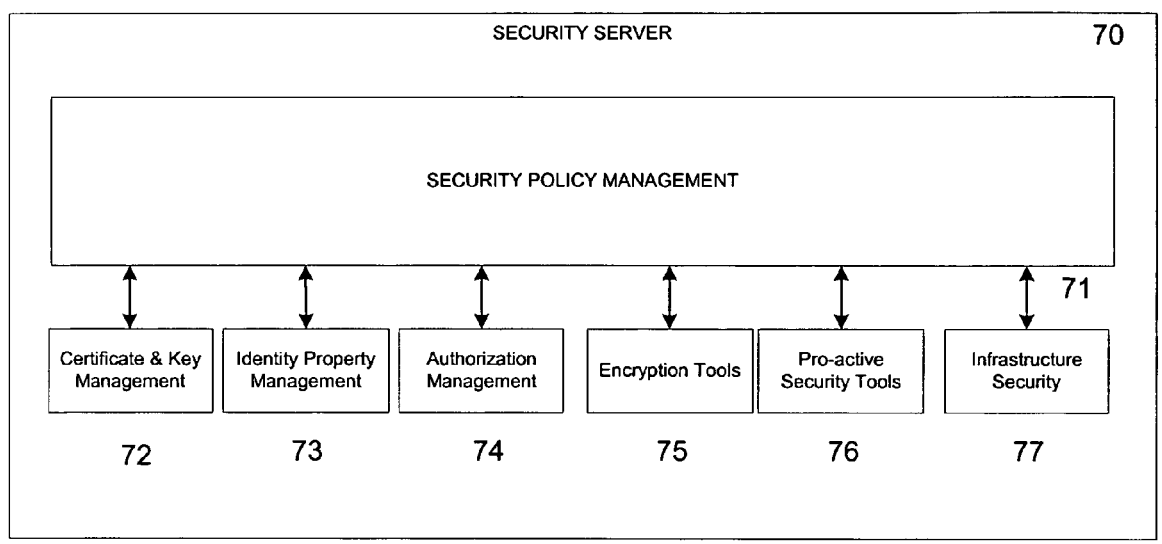
FIG. 3 is a block diagram illustrating modules of a security server in accordance to an exemplary embodiment of the present invention.

FIG. 3 illustrates an exemplary embodiment of the security server 70 found in the supplier sourcing system of the aggregated service provider system 05. The security server 70 contains several modules to provide secure business transaction and to deliver the functions of user authentication, data integrity and confidentiality. The security server 70 includes a security policy management module 71 that determines the rules and regulations of the various security modules 72-75. A certificate and key management module 72 is concerned with digital certificate, public and private key. The certificate and key management module 72 verifies and interprets the bound properties as presented in the digital certificate of a potential seller. If the properties are valid, the security policy management module 71 translates the properties according to the security policy. In one example, a seller with bound properties "A, B and C" may entitle him to access RFQ "X", as defined by the security policy.

The security server 70 further includes identity property management 73 that verifies that a user is indeed who he/she claims to be. Authorization management 74 identifies the types of information to which an authorized user can have access. Encryption tools 75 encrypt and decrypt information to ensure data integrity. Pro-active security tools 76 include technology such as application and host based Intrusion Detection System (IDS). An infrastructure security module 77, such as firewall, protects the physical network of the system.

Security Architecture—Protocol layer

Figure 4:
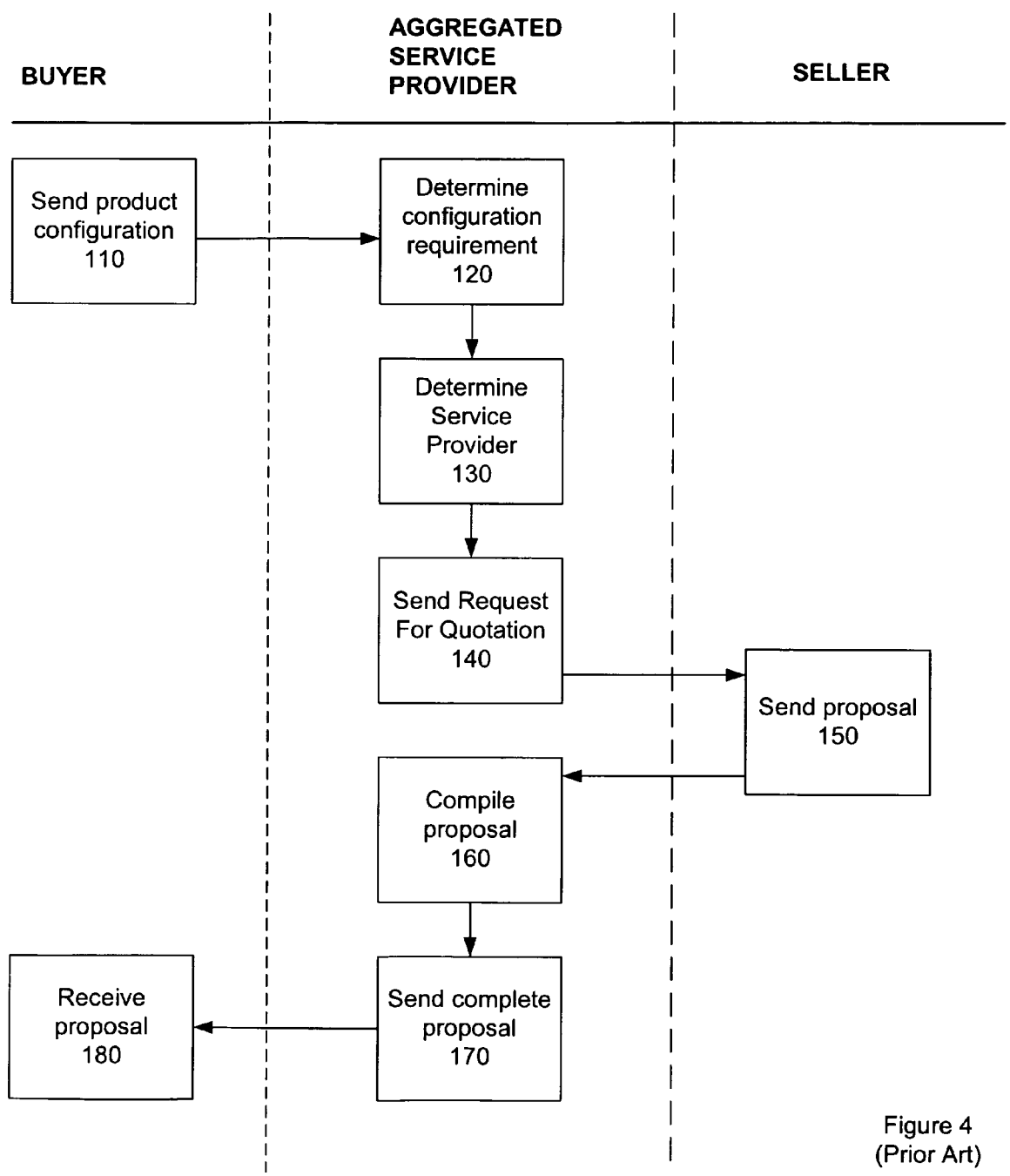
FIG. 4 is a flow chart illustrating a prior art method of establishing a trustworthy seller.

FIG. 4 illustrates a prior art approach of sourcing a seller. In this example, an aggregated service provider represents a buyer to source for appropriate sellers. The buyer first sends the product configuration to the aggregated service provider in operation 110. Upon receiving the information from the buyer, the aggregated service provider determines the configuration requirements in operation 120. In operation 130, the aggregated service provider further identifies the potential sellers that may be able to meet the product requirements. The approach of selecting the potential sellers is often based on the limited knowledge of the buyers. For examples, sellers whom the aggregated service provider already has an existing relationship or a seller who is well known in the industry. The aggregated service provider sends an RFQ to the sellers in operation 140. In response to the RFQ, the seller submits a quotation in operation 150. The aggregated service provider compiles the quotations from various suppliers in operation 160 and sends the complete quotation to the buyer in operation 170. The process is completed in operation 180 when the buyer receives the quotation.

Figure 5:
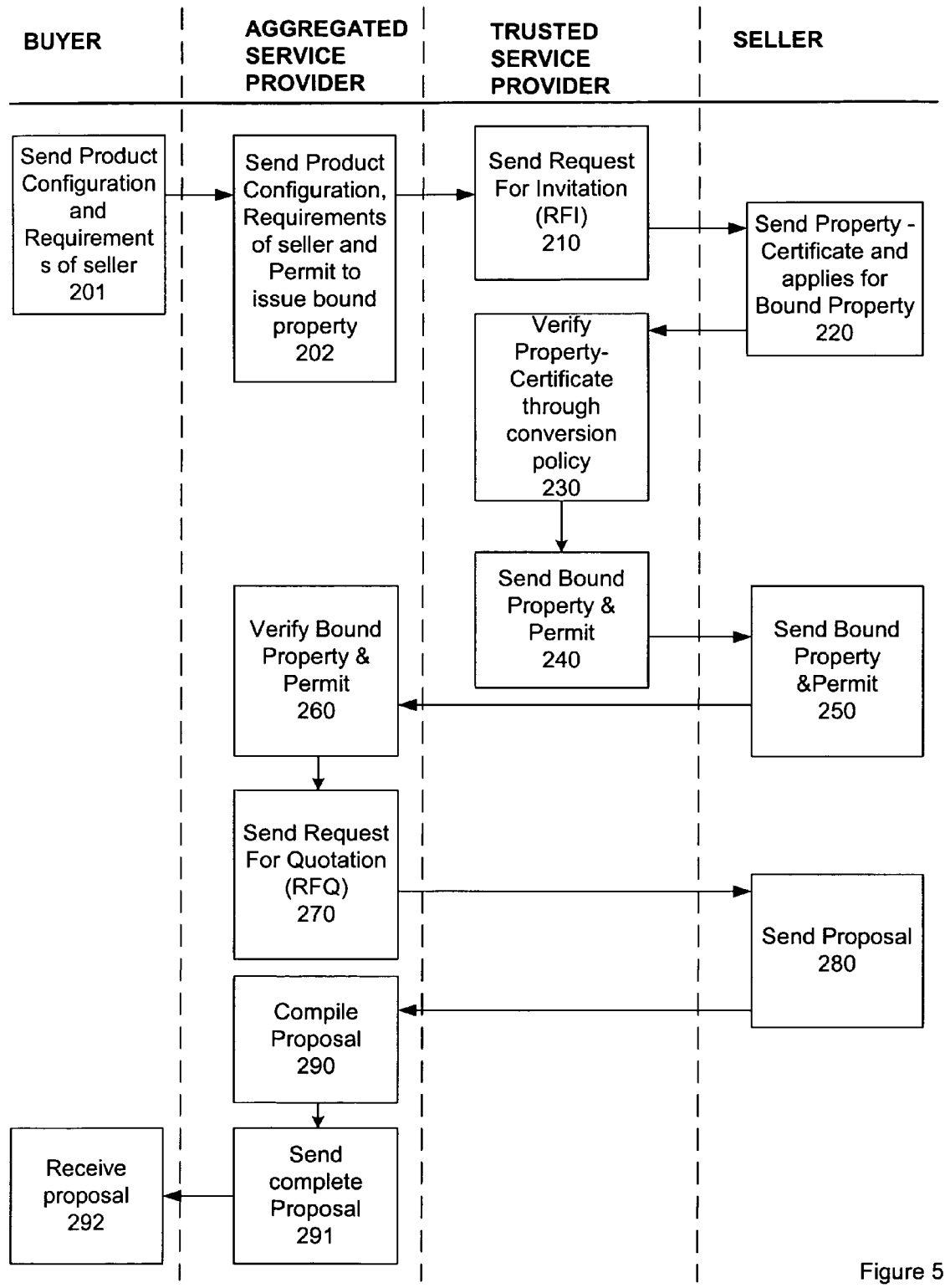
FIG. 5 is a flow chart illustrating one approach of establishing a trustworthy seller in accordance with an exemplary embodiment of the present invention.

FIG. 5 illustrates one exemplary approach of the present invention whereby an aggregated service provider establishes the trustworthiness of a seller in the process of sourcing for the sellers. With the capability to verify the trustworthiness of a seller, the aggregated service provider is not restricted to work with sellers that it is familiar with.

The process begins at operation 201 when a buyer sends a product configuration and requirements of the seller to an aggregated service provider. The product configuration details the various parts required for a product or a service. For example, the buyer may be an aircraft engine manufacturer, sourcing for parts relating to an aircraft engine. The parts of an aircraft engine may include wires, motor, exhaust and engine mount. Different sellers may supply each part of the engine.

The requirements of the seller are the qualities and credentials that the buyer is looking for in a potential seller. The credentials requirements may be defined by the buyer, or by a third party, such as a standard board or a reviewing community. The requirements may even be based on consolidated credentials that were submitted by sellers in previous transactions. The properties may include price quality, product quality or reputation of the seller. In one embodiment, the properties may be weighted.

In operation 205, the aggregated service provider sends the product configuration, requirements of the seller and the permit to issue bound property to the trusted service provider. The bound property is an award given to a seller with certain credentials. For example, the seller may be recognized for providing high quality goods with minimum defects. In another embodiment, the aggregated service provider may provide the trusted service provider with a summary of product configuration rather than the full configuration. The full configuration is unnecessary as the trusted service provider only requires sufficient information to select potential sellers that are able to provide the goods.

The trusted service provider sends a Request for Invitation (RFI) to the potential sellers in 210. The RFI protocol includes the description of the module and the required qualifications of the seller. The request may be in the form of sendRFI(module_A, required_qualification), thereby automatically including the required qualifications of the seller in the protocol.

The seller who chooses to respond to the RFI submits his property certificate in operation 220. Encoded in the property certificate are the credentials of the seller, which are affirmed by a trusted agent. A trusted agent may be a certification authority (CA), financial institute, government board, public reviewing community or private reviewing community. The trustworthiness of the seller depends on the trust that is placed on the trusted agent who issued the certificates, as the trusted agent has to accurately assess and verify the identity and properties participants.

The trusted service provider then verifies the property certificate in operation 230. The verification process uses the public and private key mechanism in the PKI infrastructure to affirm the identity of the potential seller. The trusted service provider studies the credential information encoded as properties in the certificate and converts these properties to bound properties. In one example, the properties of the seller may include high quality goods with less than X % defects per batch and that the seller is ISO 9000 certified. Based on the conversion rules, the trusted service provider may award the seller for delivering high quality goods.

In operation 240, the trusted service provider submits to the seller the bound property and the permit to issue bound property. The seller then submits these items to the aggregated service provider in operation 250. The aggregated service provider, using the permit, verifies that the seller is indeed selected by the trusted service provider. The aggregated service provider studies the bound property and further qualifies the credentials of the seller. A Request For Quotation (RFQ) is then provided to the qualified seller in operation 270.

The seller submits the proposal to the aggregated service provider in operation 280. The aggregated service provider receives proposals from various sellers and compiles the proposals as a single proposal in operation 290. For example, the aggregated service provider receives a proposal on wire from seller A and a proposal on motor from seller B. The aggregated service provider combines the proposals and presents them as a compiled proposal to be submitted to the buyer in operation 291. The process is completed in operation 292 when the buyer receives the compiled proposal.

Security Architecture—Security Policy

Figure 6:
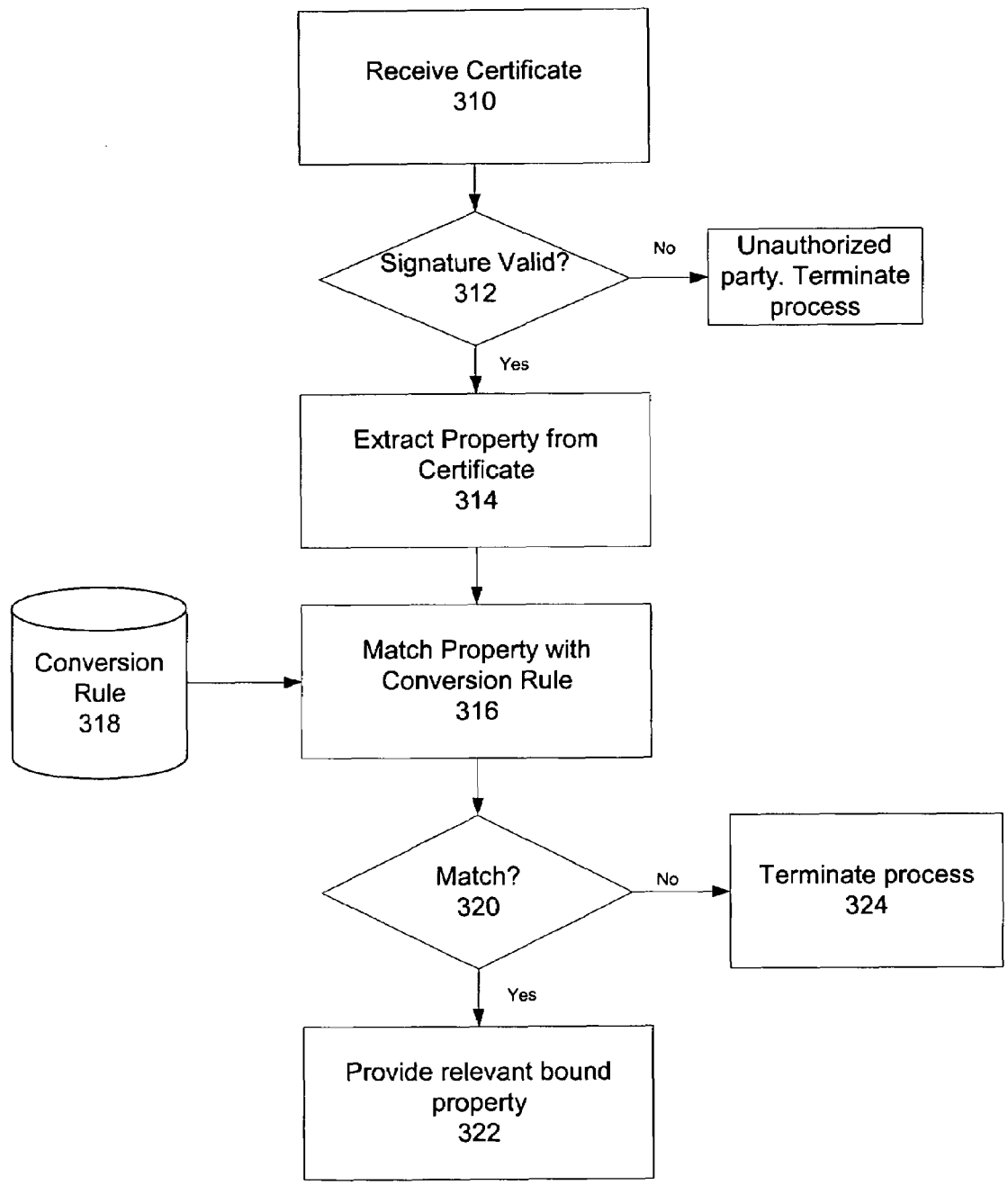
FIG. 6 is a flow chart illustrating one approach of verifying a property certificate and providing authorization access to a RFQ in accordance with an exemplary embodiment of the present invention.

FIG. 6 illustrates an exemplary embodiment of the security policy used to convert the properties in the digital certificate into bound property. When an trusted service provider receives a digital certificate at operation 310, it first verifies if the signature is valid in operation 312. This authenticates the identity of the seller. The security policy extracts the properties from the certificate in operation 314. In operation 316, the properties are matched according to the conversion rules which are stored in a secure file or database. The conversion rules specify the bound property which the seller can earn if it is able to meet certain requirements. When a match occurs in operation 320, the relevant bound property will be provided in operation 322. For example, a seller submits properties A-C, A-D and E-F. The conversion rule translates the properties and matches the A-C property to the bound property for high quality goods and A-D for on-time delivery. However, the conversion rule does not recognize the property E-F and therefore property E-F does not entitle the seller to any bound property.

Figure 7:
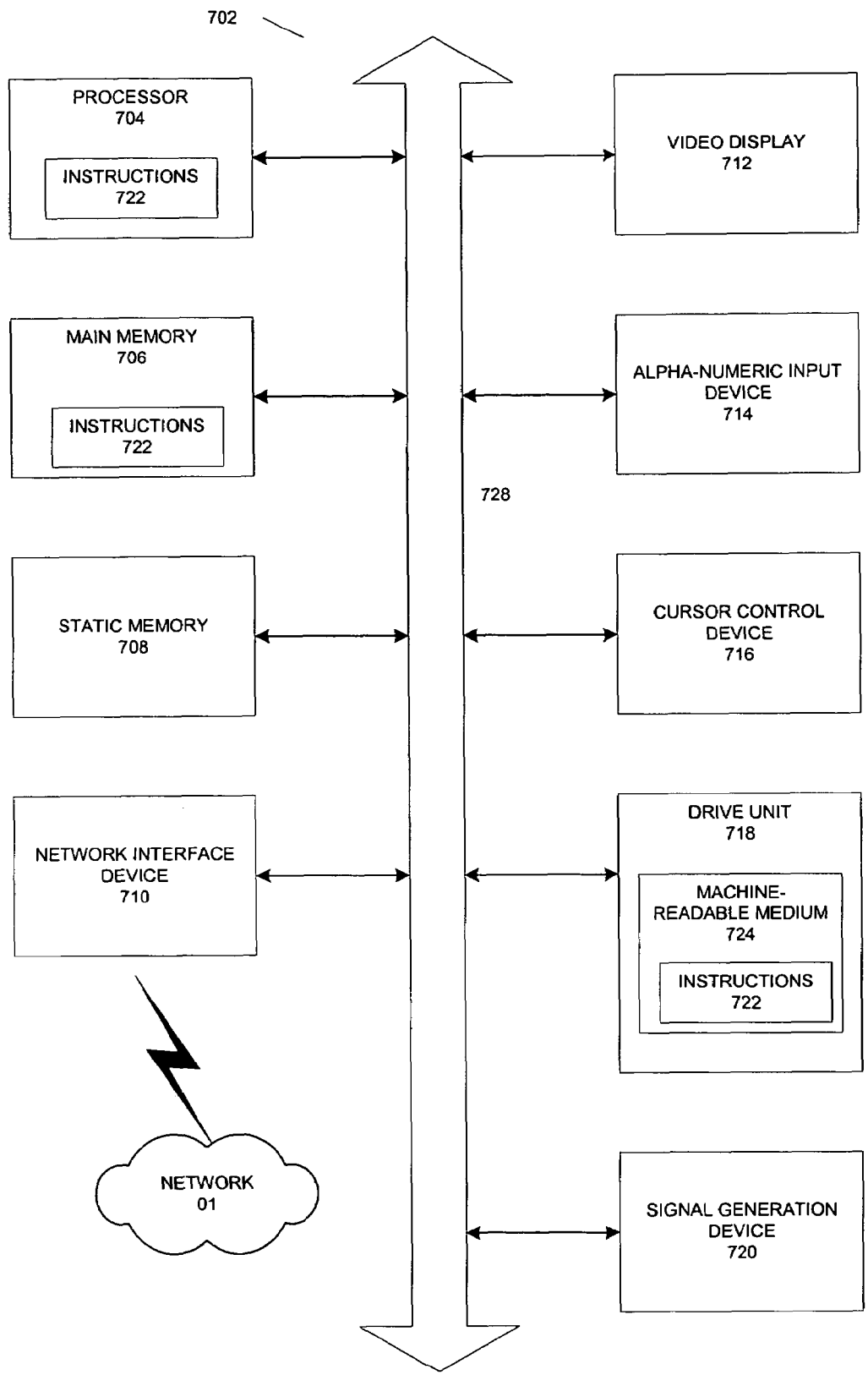
FIG. 7 is a diagrammatic representation of a machine within which a set of instructions, for causing the machine to perform any one of the methods described herein, may be executed.

FIG. 7 shows a diagrammatic representation of a machine in the exemplary form of a computer system 702 within which a set of instructions for causing the machine to perform any one or more of the above methodologies may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 702 includes a processor 704 (e.g., a central processing unit (CPU) a graphics processing unit (GPU) or both), a main memory 706 and a static memory 708, which communicate with each other via a bus 728. The computer system 702 may further include a video display unit 712 (e.g., a liquid crystal display (LCD) or a cathode ray tube (CRT)). The computer system 702 also includes an alphanumeric input device 714 (e.g., a keyboard), a cursor control device 716 (e.g., a mouse), a disk drive unit 718, a signal generation device 720 (e.g., a speaker) and a network interface device 710

The disk drive unit 718 includes a machine-readable medium 724 on which is stored one or more sets of instructions (e.g., software 722) embodying any one or more of the methodologies or functions described herein. The software 722 may also reside, completely or at least partially, within the main memory 706 and/or within the processor 704 during execution thereof by the computer system 702, the main memory 706 and the processor 704 also constituting machine-readable media.

The software 722 may further be transmitted or received over a network 01 via the network interface device 710.

While the machine-readable medium 724 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, and optical and magnetic media.

Thus, a method and system to establish a trustworthy seller has been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method for automatically evaluating a participant in a trust management infrastructure, the method including:
   providing a permit to issue a bound property;
   building a property certificate including
      assessing a qualification of the participant, and
      encoding the qualification as a property in the property certificate;
   providing a property certificate;
   issuing the permit and the bound property based on the property of the property certificate; and
   returning the permit and the bound property in exchange for a right to access a protected document, wherein the property represents the qualification of the participant and the bound property represents an award for the property.

2. The method of claim 1, wherein the assessing the qualification of the participant includes determining at least one of financial status, reputation, on-time delivery, price quality, product quality and credit terms of the participant.

3. The method of claim 2, further including classifying the qualification as a mandatory property type or an optional property type.

4. The method of claim 2, wherein the property is weighted.

5. The method of claim 1, wherein the building of the property certificate is performed by a trusted agent.

6. The method of claim 5, wherein the trusted agent is at least one of a Certification Authority, a financial institute, a government board, a public reviewing community and a private reviewing community.

7. The method of claim 1, wherein the issuing of the bound property based on the property of the property certificate includes:
   receiving the property certificate;
   verifying a signature of the property certificate;
   extracting the property from the property certificate;
   matching the property with a conversion rule; and
   providing the bound property according to the conversion rule.

8. The method of claim 1, wherein the protected item is at least one of a request for quotation, a digital resource and a physical device.

9. The method of claim 1, wherein the participant is a seller.

10. The method of claim 1, wherein the trust management infrastructure is a public key infrastructure (PKI).

11. A method for automatically evaluating a seller in a trust management infrastructure, the method including:
    providing a permit to issue a bound property;
    receiving a seller property certificate in response to an invitation to quote, the seller property certificate having a seller qualification assessment encoded as a property;
    issuing the permit and the bound property based on the property of the seller property certificate;
    returning the permit and the bound property in exchange for a right to access a request for a quotation; and
    providing the quotation, wherein the property represents a qualification of the seller and the bound property represents an award for the property.

12. The method of claim 11, wherein the assessing the qualifications of the seller includes determining at least one of financial status, reputation, on-time delivery, price quality, product quality and credit terms of the participant.

13. The method of claim 12, further including classifying the qualification as a mandatory property type or an optional property type.

14. The method of claim 12, wherein the property is weighted.

15. The method of claim 11, wherein the seller property certificate is built by a trusted agent.

16. The method of claim 15, wherein the trusted agent is at least one of a Certification Authority, a financial institute, a government board, a public reviewing community and a private reviewing community.

17. The method of claim 11, wherein the issuing of the bound property based on the property of the seller property certificate includes:
    receiving the seller property certificate;
    verifying a signature of the seller property certificate;
    extracting the property from the seller property certificate;
    matching the property with a conversion rule; and
    providing the bound property according to the conversion rule.

18. The method of claim 11, wherein the trust management infrastructure is a public key infrastructure (PKI).

19. A buyer and a seller network system for automatically evaluating a seller in a trust management infrastructure, the system including:
    means for providing a permit to issue a bound property;
    means for receiving a seller property certificate in response to an invitation to quote, the seller property certificate having a seller qualification assessment encoded as a property;
    means for issuing the permit and the bound property based on the property of the seller property certificate;
    means for returning the permit and the bound property in exchange for a right to access a request for a quotation; and
    means for providing the quotation, wherein the property represents a qualification of the seller and the bound property represents an award for the property.

20. The system of claim 19, wherein the seller qualification assessment includes determining at least one of financial status, reputation, on-time delivery, price quality, product quality and credit terms of the participant.

21. The system of claim 20, further including, means for classifying the qualifications as one of a mandatory property type and an optional property type.

22. The system of claim 20, wherein the property is weighted.

23. The method of claim 19, wherein the seller property certificate is built by a trusted agent.

24. The system of claim 23, wherein the trusted agent is at least one of a Certification Authority, a financial institute, a government board, a public reviewing community and a private reviewing community.

25. The system of claim 19, wherein the means for issuing of the bound property based on the property of the seller property certificate includes:
- means for receiving the seller property certificate;
- means for verifying a signature of the seller property certificate;
- means for extracting the property from the seller property certificate;
- means for matching the property with a conversion rule; and
- means for providing the bound property according to the conversion rule.

26. The system of claim 19, wherein the trust management infrastructure is a public key infrastructure (PKI).

27. A buyer and a seller network system for automatically evaluating a seller, the system including:
- a certification module to establish a seller property certificate;
- a bound property module to establish a permit;
- a first security policy to translate a property of the seller property certificate into the bound property; and
- a second security policy to translate the bound property and the permit into a right to access a document, wherein the permit is the right to issue the bound property and the bound property represents an award for the property.

28. A machine-readable medium including instructions, which when executed by a machine, cause the machine to perform a method to evaluate a seller in a network, the method including:
- providing a permit to issue a bound property;
- receiving a seller property certificate in response to an invitation to quote the seller property certificate having a seller qualification assessment encoded as a property;
- issuing the permit and the bound property based on the property of the seller property certificate;
- returning the permit and the bound property in exchange for a right to access a request for a quotation; and
- providing the quotation, wherein the property represents a qualification of the seller and the bound property represents an award for the property.

29. The method of claim 28, wherein the seller qualification assessment includes determining at least one of financial status, reputation, on-time delivery, price quality, product quality and credit terms of the participant.

30. The method of claim 29 further including classifying the qualifications as a mandatory property type or an optional property type.

31. The method of claim 29, wherein the property is weighted.

32. The The method of claim 28, wherein the seller property certificate is built by a trusted agent.

33. The method of claim 32, wherein the trusted agent is at least one of a Certification Authority, a financial institute, a government board, a public reviewing community and a private reviewing community.

34. The method of claim 28, wherein the issuing of the bound property based on the property of the seller property certificate includes:
- receiving the seller property certificate;
- verifying a signature of the seller property certificate;
- extracting the property from the seller property certificate;
- matching the property with a conversion rule; and
- providing the bound property according to the conversion rule.

35. The method of claim 28, wherein the trust management infrastructure is a public key infrastructure (PKI).

* * * * *